(12) United States Patent
Miyashita et al.

(10) Patent No.: US 8,730,158 B2
(45) Date of Patent: May 20, 2014

(54) INFORMATION PROCESSING DEVICE, INFORMATION PROCESSING METHOD, INFORMATION PROCESSING PROGRAM, AND INFORMATION PROCESSING SYSTEM

(75) Inventors: Ken Miyashita, Tokyo (JP); Reiko Miyazaki, Tokyo (JP); Yoshihito Ohki, Tokyo (JP); Shoichiro Moriya, Tokyo (JP)

(73) Assignee: Sony Corporation, Tokyo (JP)

( * ) Notice: Subject to any disclaimer, the term of this patent is extended or adjusted under 35 U.S.C. 154(b) by 163 days.

(21) Appl. No.: 13/359,903

(22) Filed: Jan. 27, 2012

(65) Prior Publication Data

US 2012/0200489 A1    Aug. 9, 2012

(30) Foreign Application Priority Data

Feb. 4, 2011 (JP) ................. 2011-022983

(51) Int. Cl.
*G09G 5/00* (2006.01)

(52) U.S. Cl.
USPC ......................................... 345/156; 345/169

(58) Field of Classification Search
USPC ................................................ 345/156–172
See application file for complete search history.

(56) References Cited

U.S. PATENT DOCUMENTS

2012/0127081 A1*  5/2012  Lin ............................... 345/169

FOREIGN PATENT DOCUMENTS

JP           2003-32509           1/2003

* cited by examiner

*Primary Examiner* — Kevin M Nguyen
*Assistant Examiner* — Kenneth B Lee, Jr.
(74) *Attorney, Agent, or Firm* — Oblon, Spivak, McClelland Maier & Neustadt, L.L.P.

(57) ABSTRACT

An information processing device includes a controller that decides information to be displayed on a second display section based on an attribute of an operation subject displayed on a first display section when the operation subject is operated, and a communication section that transmits control information for causing the second display section to display the information decided by the controller to a device having the second display section.

7 Claims, 13 Drawing Sheets

FIG. 5

Welcome to our Web Site!

Set Up ID and Password

Just Answer a few simple questions, select an ID and password, and you'll be all set.

Sign In — Bt1
DETAILS — Bt2

1. Tell us about yourself... — Tb1

Name | First Name
Gender | -Select One- ▽ — Lb1
Birthday | -Select Month- ▽

Last Name — Tb2
-Select Day- ▽ — Lb2
-Select Year- ▽ — Lb3

2. Select an ID and password

ID
Password
Re-type

Check

Top Page — Li

200

Cs

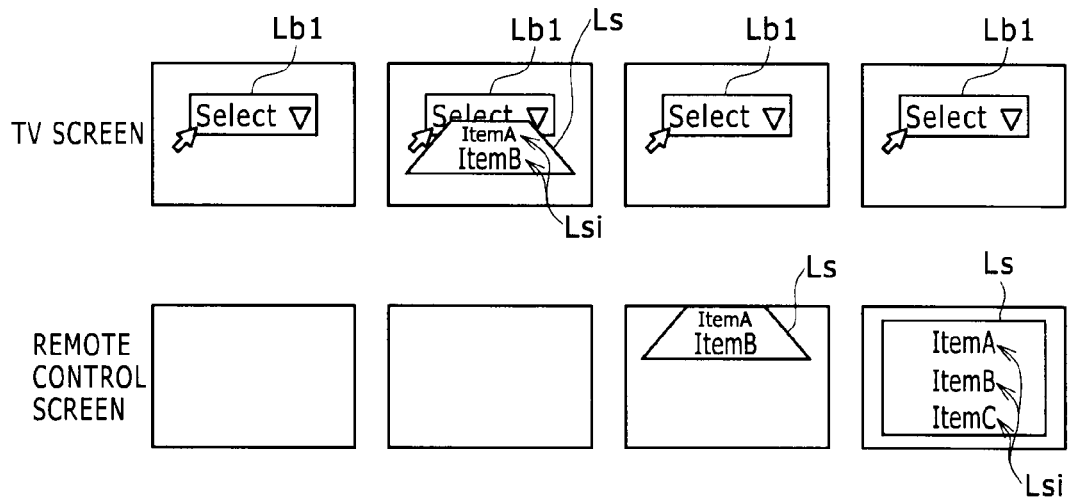
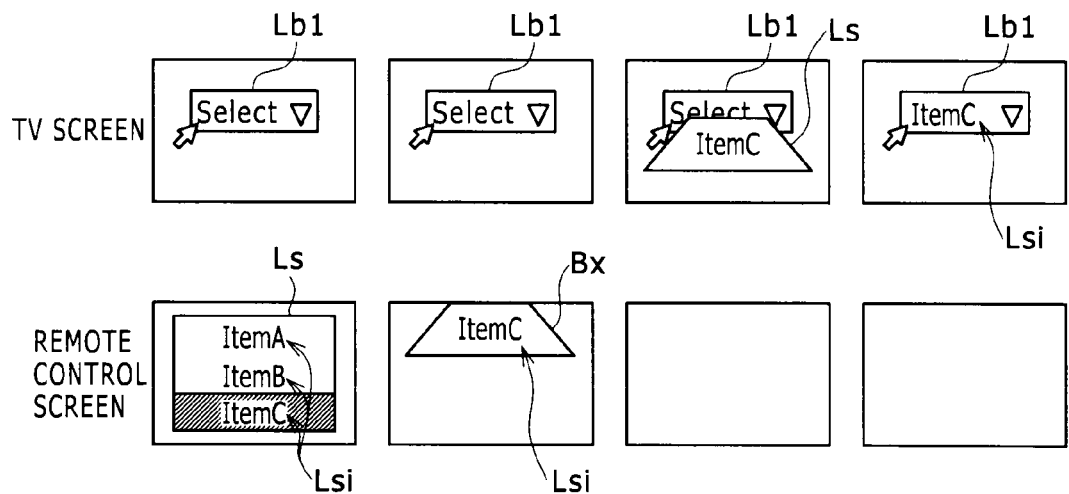

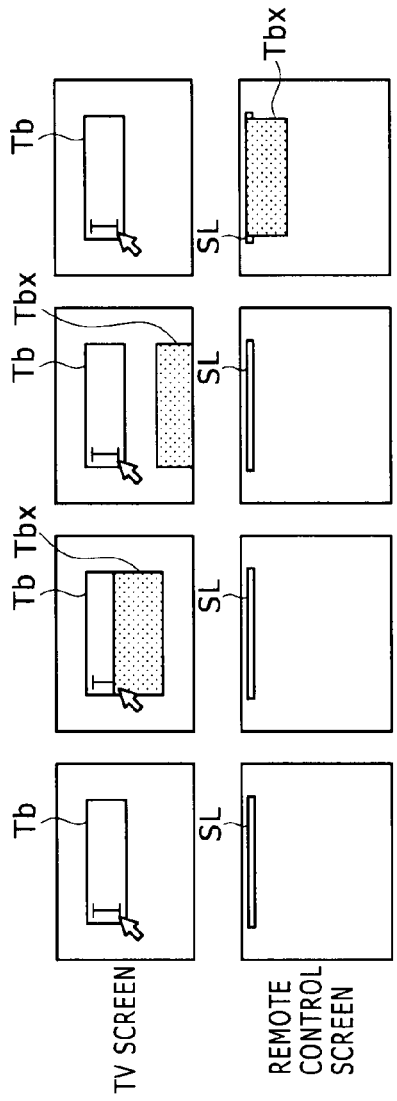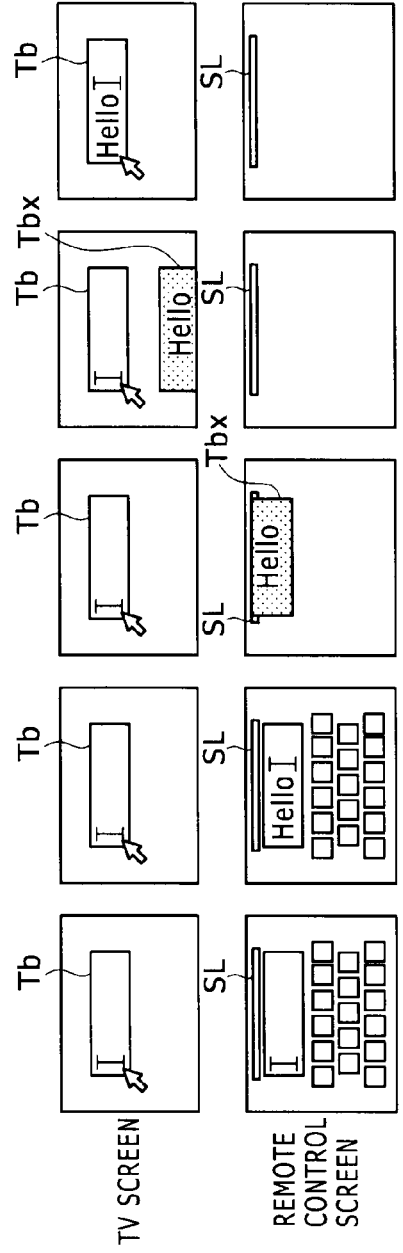

INFORMATION PROCESSING DEVICE, INFORMATION PROCESSING METHOD, INFORMATION PROCESSING PROGRAM, AND INFORMATION PROCESSING SYSTEM

BACKGROUND

The present disclosure relates to information processing devices, information processing methods, information processing programs, and information processing systems and is suitable to be applied to e.g. an information processing system that causes plural display sections to display information.

In recent years, information processing devices having a touch screen serving as both an operation section and a display section have been widely spread. Examples of such an information processing device include a remote controller (it will be referred to also as a remote control) of a television receiver (it will be referred to also as a TV receiver).

Such a remote control equipped with a touch screen cannot only allow operation of the TV receiver by touch operation to the touch screen but also display various pieces of information on the touch screen to permit the user to check them.

For example, there has been proposed a remote control that acquires data of TV listings from a TV receiver and displays the TV listings on the touch screen based on this data to thereby permit the user to select a TV show to be viewed or recorded while checking the TV listings at hand (refer to e.g. Japanese Patent Laid-open No. 2003-32509).

When being instructed to display TV listings by touch operation to the touch screen, this remote control acquires data of the TV listings from the TV receiver and displays the TV listings on the touch screen based on this data.

SUMMARY

By the way, in the case of the system composed of the above-described remote control equipped with a touch screen and the TV receiver, the whole system has plural display sections (touch screen of the remote control and display section of the TV receiver).

In such a related-art system, in order to effectively use the plural display sections, which information is displayed and which display section displays the information are decided in the whole system including from hardware configuring the system to applications that operate on the system.

Therefore, for example in the case of acquiring information that is not assumed to be displayed by using the plural display sections (e.g. Web page) from the external of the system and displaying the information in such a related-art system, the plural display sections cannot be effectively used.

As just described, in the related-art system, the plural display sections cannot be effectively used in some cases. If this point is improved, the system will become easier to use for the user.

There is provided a technique to propose information processing device, information processing method, information processing program, and information processing system that are much easier to use than the related art.

According to one embodiment of the present disclosure, there is provided an information processing device including: a controller configured to decide information to be displayed on a second display section based on an attribute of an operation subject displayed on a first display section when the operation subject is operated; and a communication section configured to transmit control information for causing the second display section to display the information decided by the controller to a device having the second display section.

According to another embodiment of the present disclosure, there is provided an information processing method including: deciding, by a controller, information to be displayed on a second display section based on an attribute of an operation subject displayed on a first display section when the operation subject is operated; and transmitting, by a communication section, control information for causing the second display section to display the information decided by the controller to a device having the second display section.

According to further embodiment of the present disclosure, there is provided an information processing program for causing an information processing device to carry out a procedure including: deciding, by a controller, information to be displayed on a second display section based on an attribute of an operation subject displayed on a first display section when the operation subject is operated; and transmitting, by a communication section, control information for causing the second display section to display the information decided by the controller to a device having the second display section.

According to further embodiment of the present disclosure, there is provided an information processing system including: a first device; and a second device, wherein the first device includes a first controller that decides information to be displayed on a second display section based on an attribute of an operation subject displayed on a first display section when the operation subject is operated, and a first communication section that transmits control information for causing the second display section to display the information decided by the first controller to the second device having the second display section, and the second device includes a second communication section that receives the control information transmitted from the first device, and a second controller that causes the second display section to display the information decided to be displayed on the second display section based on the control information received by the second communication section.

According to yet another embodiment of the present disclosure, there is provided an information processing device including: a communication section configured to receive, from a device having a first display section, control information for causing a second display section to display information decided to be displayed on the second display section based on an attribute of an operation subject displayed on the first display section when the operation subject is operated; and a controller configured to cause the second display section to display the information decided to be displayed on the second display section based on the control information received by the communication section.

According to further embodiment of the present disclosure, there is provided an information processing method including: receiving, by a communication section, from a device having a first display section, control information for causing a second display section to display information decided to be displayed on the second display section based on an attribute of an operation subject displayed on the first display section when the operation subject is operated; and causing, by a controller, the second display section to display the information decided to be displayed on the second display section based on the control information received by the communication section.

According to yet another embodiment of the present disclosure, there is provided an information processing program for causing an information processing device to carry out a procedure including: receiving, by a communication section, from a device having a first display section, control information for causing a second display section to display information decided to be displayed on the second display section based on an attribute of an operation subject displayed on the first display section when the operation subject is operated; and causing, by a controller, the second display section to display the information decided to be displayed on the second display section based on the control information received by the communication section.

In this manner, every time the operation subject displayed on the first display section is operated, the information processing device decides the information to be displayed on the second display section based on an attribute of this operation subject.

By this configuration, for example, even in the case of displaying information made based on the assumption that it is displayed on one display section, such as a Web page, this information can be displayed by effectively using the plural display sections, the first display section and the second display section.

According to one embodiment of the present disclosure, even in the case of displaying information made based on the assumption that it is displayed on one display section, this information can be displayed by effectively using the first display section and the second display section. Thus, information processing device, information processing method, information processing program, and information processing system that are much easier to use than the related art can be provided.

BRIEF DESCRIPTION OF THE DRAWINGS

FIG. 5 is a schematic diagram showing a Web page displayed on a TV screen;

FIGS. 8A to 8H are schematic diagrams for explaining a display example (3) by use of two screens;

FIGS. 13A to 13I are schematic diagrams for explaining another display example (2) by use of two screens.

DETAILED DESCRIPTION OF THE PREFERRED EMBODIMENT

The best mode for carrying out techniques of the present disclosure (hereinafter, referred to as embodiment) will be described below. The order of the description is as follows.
1. Outline of Embodiment
2. Specific Examples of Embodiment
3. Modification Examples of Embodiment

1. OUTLINE OF EMBODIMENT

First, the outline of the embodiment will be described. After this description of the outline, specific examples of the embodiment will be described and finally modification examples of the embodiment will be described.

Figure 1:
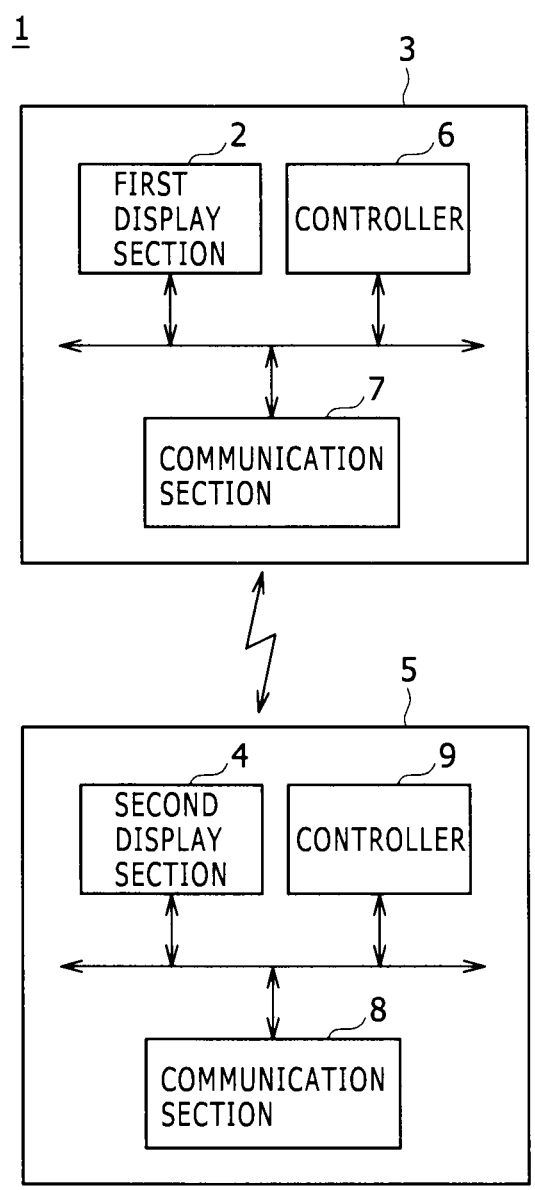
FIG. 1 is a block diagram showing the functional configuration of an information processing system as the outline of an embodiment of the present disclosure.

In FIG. 1, numeral 1 denotes an information processing system. This information processing system 1 is composed of a first device 3 having a first display section 2 and a second device 5 having a second display section 4. The first display section 2 may be provided in the first device 3 or may be connected thereto. Similarly, the second display section 4 may be provided in the second device 5 or may be connected thereto.

Furthermore, the first device 3 is provided with a controller 6. When an operation subject displayed on the first display section 2 is operated, the controller 6 decides the information to be displayed on the second display section 4 based on the attributes of this operation subject. Moreover, the first device 3 is provided with a communication section 7 that transmits control information for causing the second display section 4 to display the information decided by the controller 6 to the second device 5 having this second display section 4.

The second device 5 is provided with a communication section 8 and a controller 9. The communication section 8 receives the control information transmitted from the first device 3. The controller 9 causes the second display section 4 to display the information decided to be displayed on the second display section 4 based on the control information received by the communication section 8.

In this manner, in the information processing system 1, every time an operation subject displayed on the first display section 2 is operated, the first device 3 decides the information to be displayed on the second display section 4 based on the attributes of this operation subject.

Due to this configuration, for example, even in the case of displaying information made based on the assumption that it is displayed on one display section, the information to be displayed on the second display section 4 is decided based on the attributes of an operation subject displayed on the first display section 2, so that this information can be displayed on the second display section 4.

Specifically, when operation of selecting a text entry field displayed on the first display section 2 is carried out, the controller 6 of the first device 3 employs this text entry field as the information to be displayed on the second display section 4. Then, the communication section 7 of the first device 3 transmits, to the second device 5, control information for displaying the text entry field on the second display section 4. As a result, the text entry field is displayed on the second display section 4 by the second device 5, so that the state in which a text can be entered is obtained.

Furthermore, after transmitting the control information, the communication section 7 of the first device 3 receives entered-text information that is transmitted from the second device 5 and indicates an entered text. Then, the controller 6 of the first device 3 displays the text indicated in this entered-text information in the text entry field displayed on the first display section 2.

If the text to be entered into the text entry field displayed on the first display section 2 is confidential information, the controller 6 of the first device 3 may display the text indicated in the received entered-text information in an uncheckable state in the text entry field displayed on the first display section 2.

When operation of pressing down an additional information display button displayed on the first display section 2 is carried out, the controller 6 of the first device 3 decides additionally-displayed information to be additionally displayed in response to this operation as the information to be displayed on the second display section 4. Then, the communication section 7 of the first device 3 transmits, to the second device 5, control information for displaying the additionally-displayed information on the second display section 4. As a result, the additionally-displayed information is displayed on the second display section 4 by the second device 5.

Moreover, when operation of pressing down a displayed-content update button displayed on the first display section 2 is carried out, the controller 6 of the first device 3 decides that the information to be displayed on the second display section 4 is absent, and updates the displayed content of the first display section 2.

Furthermore, after deciding the information to be displayed on the second display section 4, the controller 6 of the first device 3 causes the first display section 2 to display such an animation that the information decided to be displayed on the second display section 4 jumps out from the screen.

In addition, upon receiving the control information transmitted from the first device 3, the controller 9 of the second device 5 causes the second display section 4 to display such an animation that the information decided to be displayed on the second display section 4 dives into the screen based on this control information.

Specific examples of the information processing system 1 having such a configuration will be described in detail below.

2. SPECIFIC EXAMPLES OF EMBODIMENT

2-1. Appearance Configuration of Portable Terminal

Figure 2:
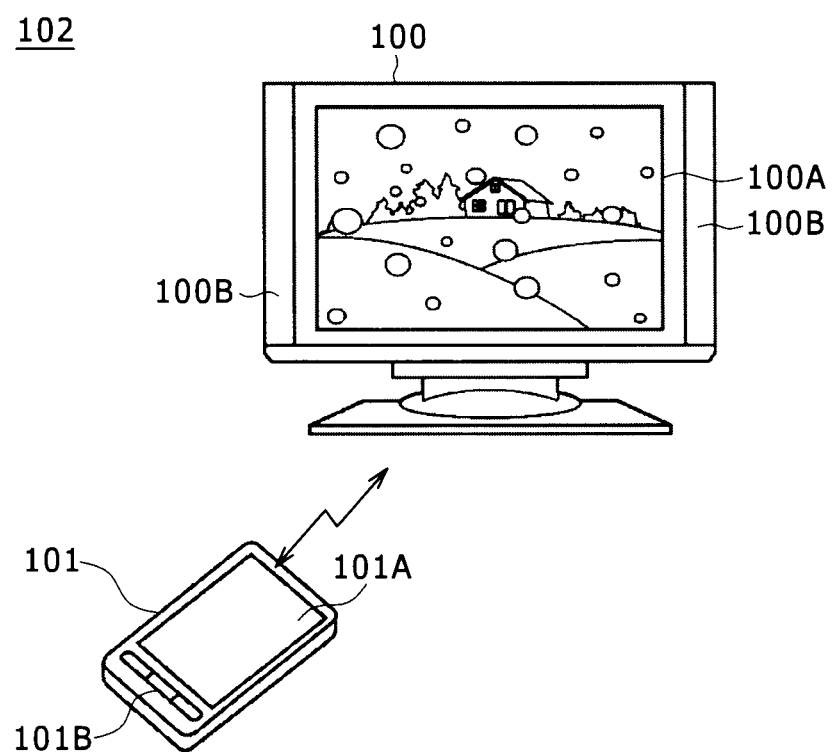
FIG. 2 is a schematic diagram showing the configuration of a TV system.

Specific examples of the present embodiment will be described. First, with reference to FIG. 2, a description will be made about the system configuration of a TV system 102 composed of a TV receiver 100 as a specific example of the above-described first device and a remote control 101 as a specific example of the second device.

The TV receiver 100 of this TV system 102 has an Internet connection function in addition to a TV broadcasting reception function.

Actually, the TV receiver 100 receives a TV broadcast signal via an antenna (not shown). Then, the TV receiver 100 extracts image and sound of TV broadcasting from the received TV broadcast signal to display the image on a display 100A and output the sound from speakers 100B. In this manner, the TV receiver 100 allows the user to view the TV broadcasting.

This TV receiver 100 is connected to the Internet via a router (not shown). The TV receiver 100 acquires page data from an arbitrary Web server on the Internet and displays a Web page based on this page data on the display 100A. In this manner, the TV receiver 100 allows the user to view the Web page.

The remote control 101 is provided with a touch screen 101A and an operation button 101B in its chassis and performs wireless communication with the TV receiver 100 by a predetermined wireless system.

Actually, when predetermined operation is carried out to the touch screen 101A or the operation button 101B, the remote control 101 transmits operation information indicating what kind of operation is carried out to the TV receiver 100. The TV receiver 100 receives this operation information and operates in accordance with this operation information.

In this manner, in the TV system 102, the TV receiver 100 can be operated by the remote control 101.

Furthermore, in this TV system 102, two screens are operated in cooperation in such a manner that the screen of the display 100A of the TV receiver 100 is used as the main screen and the screen of the touch screen 101A of the remote control 101 is used as the sub-screen, and various pieces of information are displayed on the respective screens. Hereinafter, the screen of the display 100A will be called the TV screen and the screen of the touch screen 101A will be called the remote control screen. How these two screens are used in cooperation and what kinds of information are displayed will be described in detail later.

2-2. Hardware Configurations of TV Receiver and Remote Control

Figure 3:
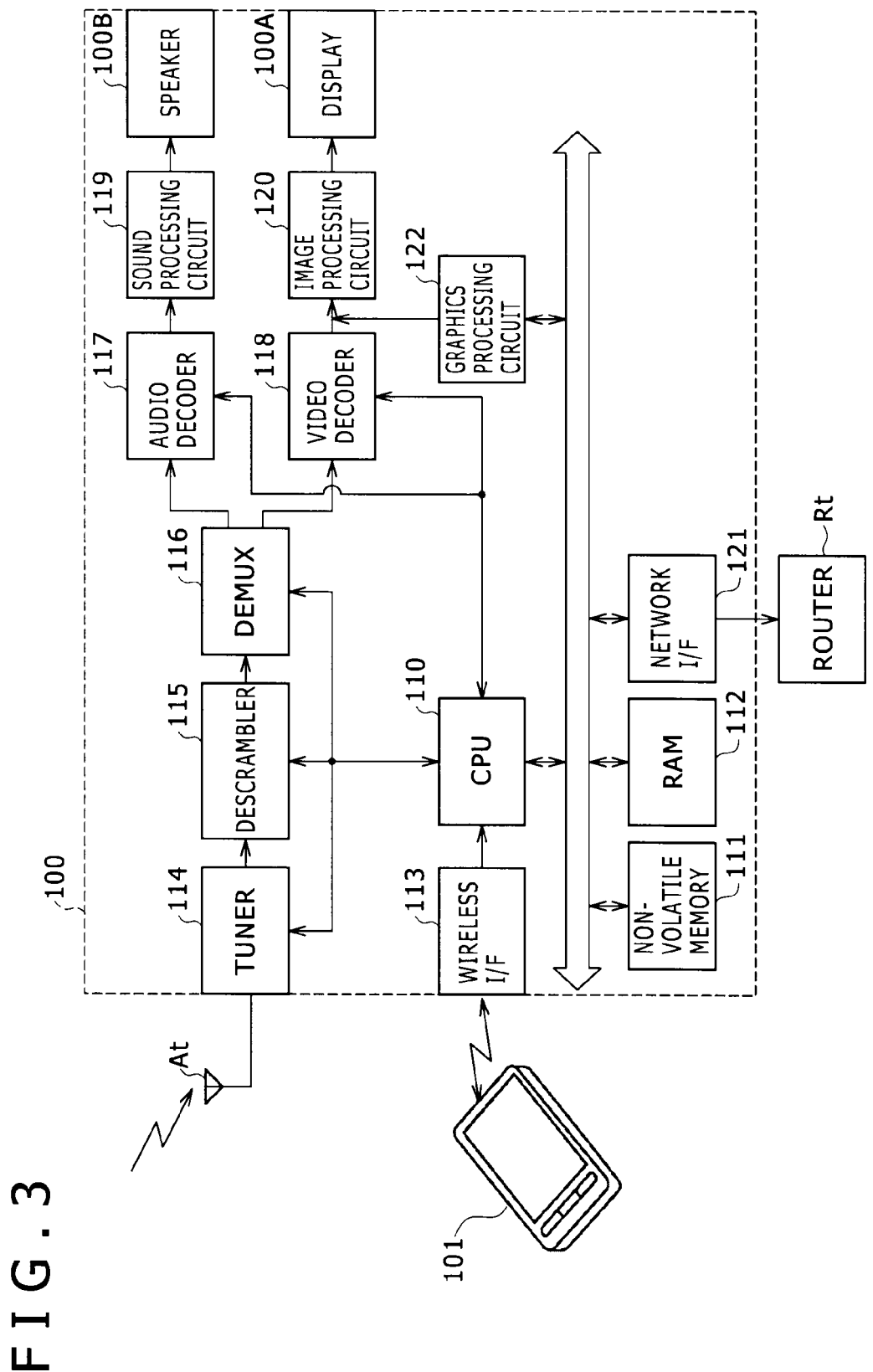
FIG. 3 is a block diagram showing the hardware configuration of a TV receiver.

The hardware configurations of the TV receiver 100 and the remote control 101 will be described below. First, with reference to FIG. 3, the hardware configuration of the TV receiver 100 will be described.

In the TV receiver 100, a CPU 110 loads a program stored in a non-volatile memory 111 into a RAM 112 and runs this program to thereby control the whole device.

The TV receiver 100 communicates with the remote control 101 by a wireless interface (I/F) 113. For example, the TV receiver 100 receives operation information transmitted from the remote control 101 by this wireless I/F 113 and sends it to the CPU 110. The CPU 110 controls the operation of the respective sections of the TV receiver 100 in accordance with this operation information.

Suppose that actually operation of ordering reception of TV broadcasting is carried out to the remote control 101. Thereupon, the CPU 110 acquires operation information transmitted from the remote control 101 via the wireless I/F 113 and recognizes that the operation of ordering reception of TV broadcasting is carried out based on this operation information to control the operation of the respective sections so that the TV broadcasting may be received.

Specifically, under the control by the CPU 110, a tuner 114 obtains e.g. a transport stream of the TV channel specified by operation of the remote control 101 from a TV broadcast signal received by an antenna At, and sends it to a descrambler 115.

Under the control by the CPU 110, the descrambler 115 obtains a key for descrambling the transport stream from a predetermined IC card (not shown) mounted in the TV receiver 100, and descrambles the sent transport stream by this key. Then, the descrambler 115 sends this descrambled transport stream to a demultiplexer (DEMUX) 116.

Under the control by the CPU 110, the demultiplexer 116 separates audio data and video data from the descrambled transport stream to send the audio data to an audio decoder 117 and send the video data to a video decoder 118.

Under the control by the CPU 110, the audio decoder 117 decodes the sent audio data to thereby obtain sound data and send it to a sound processing circuit 119. The sound processing circuit 119 executes sound processing for the sent sound data to thereby obtain a sound signal and send it to the speaker 100B. As a result, sound based on the sound signal, i.e. sound of the TV broadcasting, is output from the speaker 100B.

Under the control by the CPU 110, the video decoder 118 decodes the sent video data to thereby obtain image data and send it to an image processing circuit 120. The image processing circuit 120 executes image processing for the sent image data to thereby obtain an image signal and send it to the display 100A. As a result, an image based on the image signal, i.e. an image of the TV broadcasting, is displayed on the display 100A.

In this manner, the TV receiver 100 allows the user to view a TV show.

Furthermore, the TV receiver 100 is connected to a router Rt via a network interface (I/F) 121 and is connected to the Internet via this router Rt.

Suppose that actually operation of ordering connection to the Internet is carried out to the remote control 101. Thereupon, the CPU 110 recognizes that the operation of ordering connection to the Internet is carried out based on operation information sent from the wireless I/F 113 and connects to the Internet via the network I/F 121.

Moreover, the CPU 110 receives e.g. page data of the Web page specified by operation of the remote control 101 from the Internet via the network I/F 121 and sends it to a graphics processing circuit 122.

Under the control by the CPU 110, the graphics processing circuit 122 generates image data of the Web page based on the page data and sends it to the image processing circuit 120. The image processing circuit 120 executes image processing for the sent image data to thereby obtain an image signal and send it to the display 100A. As a result, an image based on the image signal, i.e. the Web page, is displayed on the display 100A.

At this time, on the display 100A, a cursor for specifying an arbitrary place is also displayed on the Web page.

The CPU 110 appropriately transmits control information to the remote control 101 via the wireless I/F 113 to thereby also control the operation of the remote control 101.

Specifically, the CPU 110 transmits e.g. control information for causing the remote control 101 to display predetermined information on the touch screen 101A to the remote control 101 via the wireless I/F 113. As a result, the predetermined information is displayed on the touch screen 101A of the remote control 101.

That is, the TV receiver 100 does not only display information on its own display 100A but also can display information on the touch screen 101A of the remote control 101.

Figure 4:
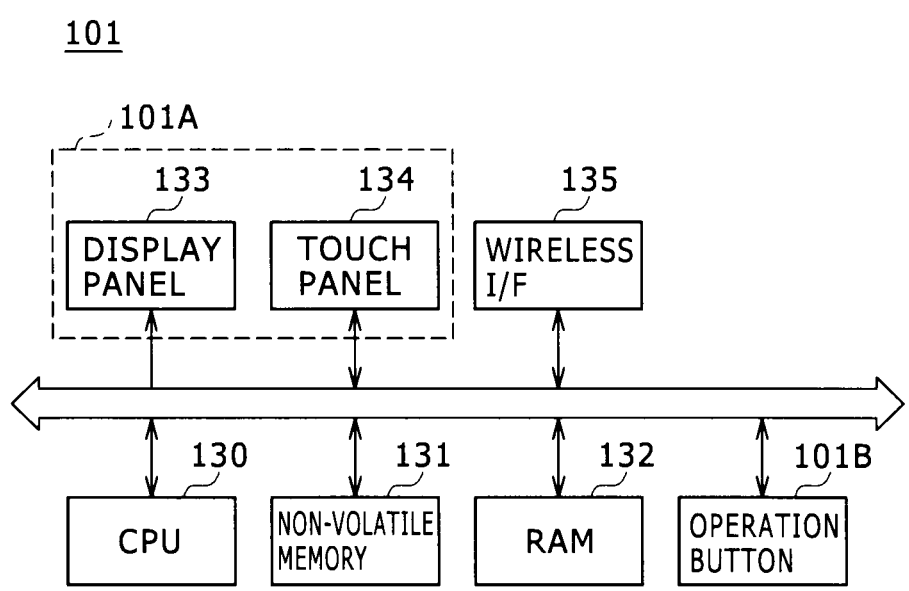
FIG. 4 is a block diagram showing the hardware configuration of a remote control.

The hardware configuration of the remote control 101 will be described below with reference to FIG. 4. In the remote control 101, a CPU 130 loads a program stored in a nonvolatile memory 131 into a RAM 132 and runs this program to thereby control the whole device.

The touch screen 101A provided in the chassis of the remote control 101 is composed of a display panel 133 that is a display device to display various kinds of information and a touch panel 134 that is an operation input device to accept operation inputs.

The CPU 130 acquires a touch position on the operation surface, output from this touch panel 134, and converts it to the screen coordinates of the display panel 133 to thereby recognize which place on the screen is touched.

Furthermore, the CPU 130 acquires the touch position output from the touch panel 134 every predetermined time to thereby detect the displacement of the touch position. The CPU 130 recognizes how the touch position is moved on the screen (i.e. trajectory of the touch position) based on this displacement of the touch position.

The CPU 130 identifies what kind of touch operation is carried out to the screen based on the touch position and its trajectory recognized in this manner, and accepts this touch operation as an operation input.

The CPU 130 accepts, as an operation input, touch operation such as touch, tap (touch and move away), drag (trace), and flick (sweep).

When recognizing press-down operation to the operation button 101B, the CPU 130 also accepts it as an operation input by the user.

The remote control 101 communicates with the TV receiver 100 by a wireless interface (I/F) 135. For example, when predetermined touch operation is carried out to the touch screen 101A, the remote control 101 transmits the operation information corresponding to this touch operation to the TV receiver 100 via the wireless I/F 135.

For example, suppose that the user taps an icon corresponding to TV broadcasting when this icon is being displayed on the touch screen 101A.

Thereupon, the CPU 130 transmits operation information indicating that such touch operation is carried out to the TV receiver 100 via the wireless I/F 135. The TV receiver 100 recognizes that operation of ordering reception of TV broadcasting is carried out based on this operation information to display video of the TV broadcasting on the display 100A and output sound from the speaker 100B.

Furthermore, for example, suppose that the user taps an icon corresponding to the Internet when this icon is being displayed on the touch screen 101A.

Thereupon, the CPU 130 transmits operation information indicating that such touch operation is carried out to the TV receiver 100 via the wireless I/F 135. The TV receiver 100 recognizes that operation of ordering connection to the Internet is carried out based on this operation information to connect to the Internet and display e.g. a Web page set as a home page on the display 100A.

In addition, suppose that the user drags e.g. a fingertip on the touch screen 101A of the remote control 101 when a Web page is being displayed on the TV receiver 100.

Thereupon, the CPU 130 transmits operation information indicating that such touch operation is carried out to the TV receiver 100 via the wireless I/F 135. The TV receiver 100 recognizes that operation of ordering cursor movement is carried out based on this operation information, and moves the cursor displayed on the Web page. Such touch operation (drag) will be called also cursor movement operation.

In addition, suppose that the user taps a place on the touch screen 101A of the remote control 101 when this cursor is positioned at an arbitrary place.

Thereupon, the CPU 130 transmits operation information indicating that such touch operation is carried out to the TV receiver 100 via the wireless I/F 135. The TV receiver 100 recognizes that operation of ordering selection of the place specified by the cursor is carried out based on this operation information, and selects the place specified by the cursor in the Web page. Such touch operation (tap) will be called also selection operation.

In this manner, the remote control 101 functions as the operation section of the TV receiver 100.

Furthermore, the remote control 101 receives control information transmitted from the TV receiver 100 by the wireless I/F 135 and sends it to the CPU 130. The CPU 130 controls the operation of the respective sections of the remote control 101 in accordance with this control information.

Suppose that control information for displaying predetermined information on the touch screen 101A is transmitted from the TV receiver 100.

Thereupon, the CPU 130 acquires this control information via the wireless I/F 135 and displays the specified information on the touch screen 101A based on this control information.

In this manner, the remote control 101 can be controlled from the side of the TV receiver 100 and functions as e.g. a sub-display of the TV receiver 100.

A specific hardware example of the first display section 2 of the first device 3 described in the outline of the embodiment is the display 100A of the above-described TV receiver 100. A specific hardware example of the controller 6 of the first device 3 is the CPU 110 of the TV receiver 100. A specific hardware example of the communication section 7 of the first device 3 is the wireless I/F 113 of the TV receiver 100.

A specific hardware example of the second display section 4 of the second device 5 is the touch screen 101A of the remote control 101. A specific hardware example of the communication section 8 of the second device 5 is the wireless I/F 135 of the remote control 101. A specific hardware example of the controller 9 of the second device 5 is the CPU 130 of the remote control 101.

2-3. Displaying of Information by Use of Two Display Sections

With use of specific examples, a detailed description will be made below about operation when two screens are operated in cooperation in such a manner that the TV screen of the TV receiver 100 is used as the main screen and the remote control screen of the remote control 101 is used as the subscreen and information is displayed on the respective screens.

First, suppose that an arbitrary Web page 200 is displayed on the TV screen (i.e. main screen) as shown in FIG. 5. The display control of the TV screen is carried out mainly by the CPU 110 of the TV receiver 100.

Here, suppose that the Web page 200 for user registration to a certain service is displayed on the TV screen as one example. This Web page 200 is a page that is described by a markup language such as the HTML and is publicly disclosed on the Internet.

In this Web page 200, various objects as operation subjects are disposed. Specifically, the following objects are disposed: text boxes Tb1 and Tb2 for the direct entry of the first name and last name, respectively, of the user by a text; and list boxes Lb1, Lb2, and Lb3 for selection and entry of the month, day, year, respectively, of the birth date of the user from the list.

The following buttons are also disposed: a display button Bt1 for separately displaying a window for input of the information necessary for sign-in by the user who has already completed the user registration; and a display button Bt2 for separately displaying a window in which detailed information relating to the service is described.

Furthermore, in this Web page 200, a link button Li for jump to the top page of the site and so forth is also disposed.

On the TV screen, the Web page 200 having such a configuration is displayed and a cursor Cs for specifying an arbitrary place on the Web page 200 is also displayed.

Moreover, in this TV screen, the cursor Cs can be moved to an arbitrary position on the Web page 200 by cursor movement operation (drag) to the remote control 101 by the user.

In addition, in this TV screen, the focus can be put on a desired object by moving the cursor Cs onto the desired object and the focused object is so displayed as to be accentuated.

Furthermore, in this TV screen, the focused object can be selected by selection operation (tap) to the remote control 101 by the user in the state in which the focus is put on the desired object.

When an object is selected on the TV screen in this manner, the CPU 110 of the TV receiver 100 decides the information to be displayed on the remote control screen (i.e. sub-screen) depending on the kind of the selected object.

Then, the CPU 110 of the TV receiver 100 transmits control information for displaying this information on the remote control screen to the remote control 101 via the wireless I/F 113 to thereby display this information on the remote control screen.

Figures 6A, 6B, 6C, 6D:
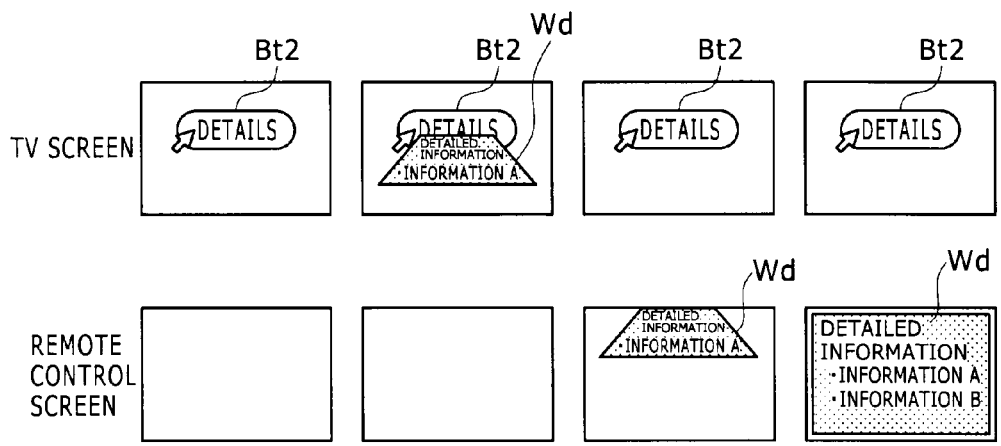
FIGS. 6A to 6D are schematic diagrams for explaining a display example (1) by use of two screens.

More specifically, for example, suppose that the selected object is the display button Bt (e.g. Bt2) as shown in FIG. 6A.

Although the whole Web page 200 is displayed on the actual TV screen as shown in FIG. 5, only the selected object is displayed on the TV screen in FIGS. 6 to 9 for easy understanding of the description.

At this time, the CPU 110 of the TV receiver 100 employs the window associated with this display button Bt2 (i.e. window that is so specified as to be displayed when the display button Bt2 is selected and includes detailed information of the service) as the information to be displayed on the remote control screen.

As shown in FIG. 6B, the CPU 110 of the TV receiver 100 first causes the TV screen to display such an animation that a window Wd associated with the selected display button Bt2 jumps out to the front side of the screen. At this timing, no object has been displayed on the remote control screen.

Subsequently, the CPU 110 transmits control information for displaying this window Wd on the remote control screen to the remote control 101 via the wireless I/F 113. This control information includes e.g. image data of the window Wd and a command to order displaying of the window Wd based on this image data.

The CPU 130 of the remote control 101 receives this control information via the wireless I/F 135. Thereupon, the CPU 130 causes the remote control screen to display such an animation that the window Wd dives from the back side of the screen as shown in FIG. 6C based on this control information.

In this manner, in the TV system 102, after such an animation that the window Wd jumps out from the TV screen to the front side is displayed, such an animation that the window Wd dives into the remote control screen from the back side is displayed. By this operation, in the TV system 102, the gaze point of the user viewing the TV screen is induced from the TV screen to the remote control screen at hand.

Thereafter, as shown in FIG. 6D, the CPU 130 displays this window Wd on the remote control screen in a settled manner.

This provides the state in which the window Wd, which is associated with the display button Bt2 selected on the TV screen and includes detailed information of the service, can be checked on the remote control screen.

In the above-described manner, in the TV system 102, first the Web page 200 is displayed on the TV screen. When the display button Bt in this Web page 200 is selected, the window Wd that is so specified as to be displayed when this display button Bt is selected is displayed on the remote control screen.

Due to this configuration, in this TV system 102, two screens can be effectively used: the TV screen is used for browsing a Web page and the remote control screen is used for checking the window Wd separately displayed in response to selection of the display button Bt in the Web page.

Figures 7A, 7B, 7C, 7D:
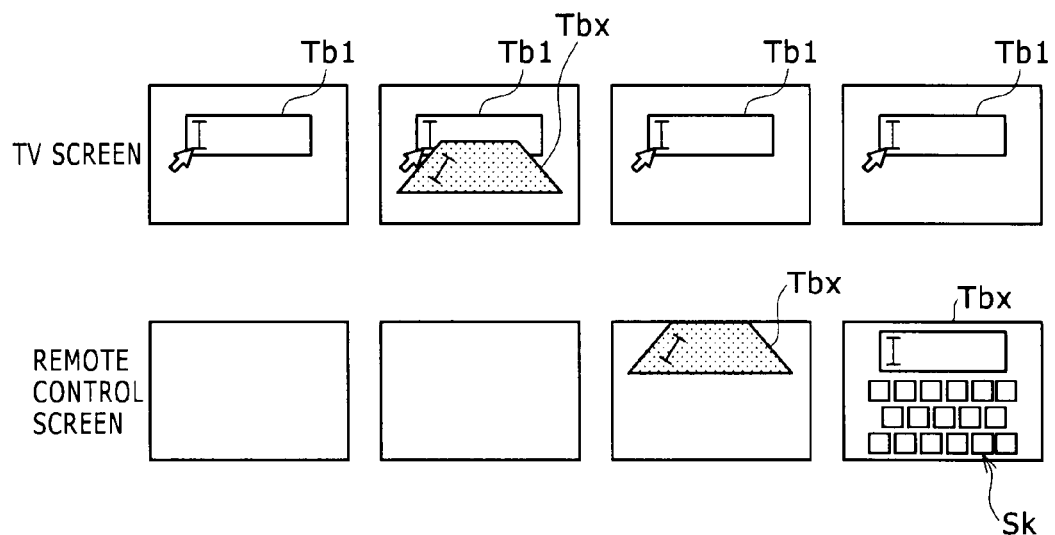
FIGS. 7A to 7H are schematic diagrams for explaining a display example (2) by use of two screens.

Another operation way is as follows. For example, suppose that the selected object is the text box Tb (e.g. Tb1) as shown in FIG. 7A. In this case, the CPU 110 of the TV receiver 100 employs a text box and a software keyboard for a character entry into this text box as the information to be displayed on the remote control screen.

Then, as shown in FIG. 7B, first the CPU 110 of the TV receiver 100 causes the TV screen to display such an animation that a text box Tbx as a copy of the selected text box Tb1 jumps out to the front side of the screen. At this timing, no object has been displayed on the remote control screen.

Subsequently, the CPU 110 transmits control information for displaying the text box and the software keyboard on the remote control screen to the remote control 101 via the wireless I/F 113.

The CPU 130 of the remote control 101 receives this control information via the wireless I/F 135. Thereupon, the CPU 130 causes the remote control screen to display such an animation that the text box Tbx dives from the back side of the screen as shown in FIG. 7C based on this control information.

In this manner, in the TV system 102, after such an animation that the text box Tbx jumps out from the TV screen to the remote control side is displayed, such an animation that the text box Tbx dives into the remote control screen from the TV side is displayed. By this operation, in the TV system 102, the gaze point of the user viewing the TV screen is induced from the TV screen to the remote control screen.

Thereafter, as shown in FIG. 7D, the CPU 130 displays this text box Tbx at a predetermined position on the remote control screen in a settled manner and displays a software keyboard Sk composed of plural key images below this text box Tbx.

At this timing, the state in which a character entry into the text box Tbx on the remote control screen is possible is obtained.

Figures 7E, 7F, 7G, 7H:
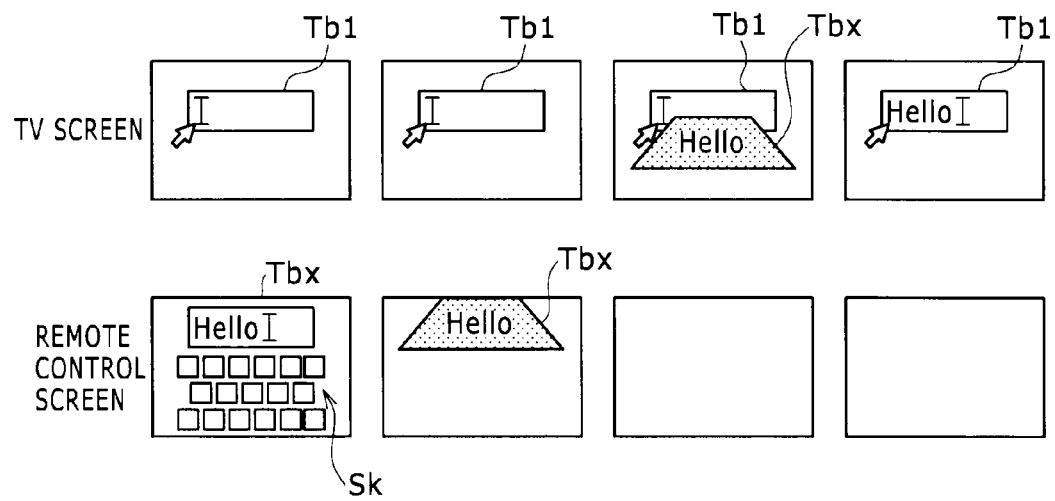

Then, as shown in FIG. 7E, every time the key image of the software keyboard Sk displayed on the remote control screen is tapped, the CPU 130 of the remote control 101 displays the character corresponding to the tapped key image in the text box Tbx displayed on the remote control screen.

Thereafter, when a predetermined key image (e.g. return key image) of the software keyboard Sk is tapped, the CPU 130 determines that the character entry by the user is completed.

Then, as shown in FIG. 7F, the CPU 130 stops the displaying of the software keyboard Sk and causes the remote control screen to display such an animation that the text box Tbx in which the entered text is displayed jumps out to the back side of the screen.

Subsequently, the CPU 130 transmits entered-text information indicating the text in the text box Tbx, i.e. the entered text, to the TV receiver 100 via the wireless I/F 135.

The CPU 110 of the TV receiver 100 receives this entered-text information via the wireless I/F 113. Thereupon, as shown in FIG. 7G, the CPU 110 causes the TV screen to display such an animation that the text box Tbx in which the text indicated in the entered-text information is displayed dives from the front side of the screen.

In this manner, in the TV system 102, after such an animation that the text box Tbx jumps out from the remote control screen to the TV side is displayed, such an animation that the text box Tbx dives into the TV screen from the remote control side is displayed. By this operation, in the TV system 102, the gaze point of the user viewing the remote control screen is returned to the TV screen again.

Thereafter, as shown in FIG. 7H, the CPU 110 displays the text indicated in the entered-text information in the currently-selected text box Tb displayed on the TV screen. At this timing, the text entry into the text box Tb on the TV screen is completed.

In the above-described manner, in the TV system 102, first the Web page 200 is displayed on the TV screen. When the text box Tb in this Web page 200 is selected, the text box Tbx and the software keyboard Sk are displayed on the remote control screen.

Due to this configuration, in this TV system 102, two screens can be effectively used: the TV screen is used for browsing a Web page and the remote control screen is used for an entry into a text box in the Web page.

Further another operation way is as follows. For example, suppose that the selected object is the list box Lb (e.g. Lb1) as shown in FIG. 8A. In this case, the CPU 110 of the TV receiver 100 employs a list Ls associated with this list box Lb1 (i.e. list that is so specified as to be displayed when the list box Lb1 is selected) as the information to be displayed on the remote control screen.

Then, as shown in FIG. 8B, first the CPU 110 of the TV receiver 100 causes the TV screen to display such an animation that the list Ls associated with the selected list box Lb1 jumps out to the front side of the screen. In this list Ls, plural selectable items Lsi are described. At this timing, no object has been displayed on the remote control screen.

Subsequently, the CPU 110 transmits control information for displaying the list Ls on the remote control screen to the remote control 101 via the wireless I/F 113. This control information includes e.g. item information indicating the items Lsi of the list Ls and a command to order displaying of the list Ls based on this item information.

The CPU 130 of the remote control 101 receives this control information via the wireless I/F 135. Thereupon, the CPU 130 causes the remote control screen to display such an animation that the list Ls dives from the back side of the screen as shown in FIG. 8C based on this control information.

In this manner, in the TV system 102, after such an animation that the list Ls jumps out from the TV screen to the remote control side is displayed, such an animation that the list Ls dives into the remote control screen from the TV side is displayed. By this operation, in the TV system 102, the gaze point of the user viewing the TV screen is induced from the TV screen to the remote control screen.

Thereafter, as shown in FIG. 8D, the CPU 130 displays this list Ls on the remote control screen in a settled manner.

This provides the state in which the list Ls associated with the list box Lb selected on the TV screen can be checked on the remote control screen.

Then, as shown in FIG. 8E, when one of the plural items Lsi described in the list Ls displayed on the remote control screen is tapped, the CPU 130 of the remote control 101 determines that the item Lsi is selected by the user.

Thereupon, as shown in FIG. 8F, the CPU 130 causes the remote control screen to display such an animation that a box Bx in which only the selected item Lsi (i.e. tapped item Lsi) is described jumps out to the back side of the screen.

Subsequently, the CPU 130 transmits selected-item information indicating the item Lsi selected from the list Ls to the TV receiver 100 via the wireless I/F 135.

The CPU 110 of the TV receiver 100 receives this selected-item information via the wireless I/F 113. Thereupon, as shown in FIG. 8G, the CPU 110 causes the TV screen to display such an animation that the box Bx in which only the selected item Lsi is described dives from the front side of the screen.

In this manner, in the TV system 102, after such an animation that the box Bx jumps out from the remote control screen to the TV side is displayed, such an animation that the box Bx dives into the TV screen from the remote control side is displayed. By this operation, in the TV system 102, the gaze point of the user viewing the remote control screen is returned to the TV screen again.

Thereafter, as shown in FIG. 8H, the CPU 110 displays the item Lsi indicated in the selected-item information in the currently-selected list box Lb1 displayed on the TV screen. At this timing, the item selection for the list box Lb1 on the TV screen is completed.

In the above-described manner, in the TV system 102, first a Web page is displayed on the TV screen. When the list box Lb1 in this Web page is selected, the list Ls associated with the list box Lb1 is displayed on the remote control screen.

Due to this configuration, in this TV system 102, two screens can be effectively used: the TV screen is used for browsing a Web page and the remote control screen is used for checking the list Ls associated with the list box Lb in the Web page and selecting an item from the list Ls.

Furthermore, for example, suppose that the selected object is the link button Li. In this case, the CPU 110 of the TV receiver 100 decides that the information to be displayed on the remote control screen is absent.

Then, the CPU 110 of the TV receiver 100 causes the TV screen to display the Web page of the link destination address associated with the link button Li instead of the currently-displayed Web page.

In the above-described manner, in the TV system 102, only the TV screen, which is larger than the remote control screen, is used regarding browsing of a Web page.

2-4. Processing Procedure

A description will be made below about the procedure of processing executed by the TV receiver 100 and the remote control 101 (it will be referred to also as the two-screen display processing procedure) when two screens, the TV screen and the remote control screen, are used in cooperation and information is displayed on the respective screens.

In the following, first the outline of the two-screen display processing procedure carried out on the side of the TV receiver 100 and the side of the remote control 101 will be briefly described. Next, details of the two-screen display processing procedure carried out on the side of the TV receiver 100 and the side of the remote control 101 will be described.

Figure 9:
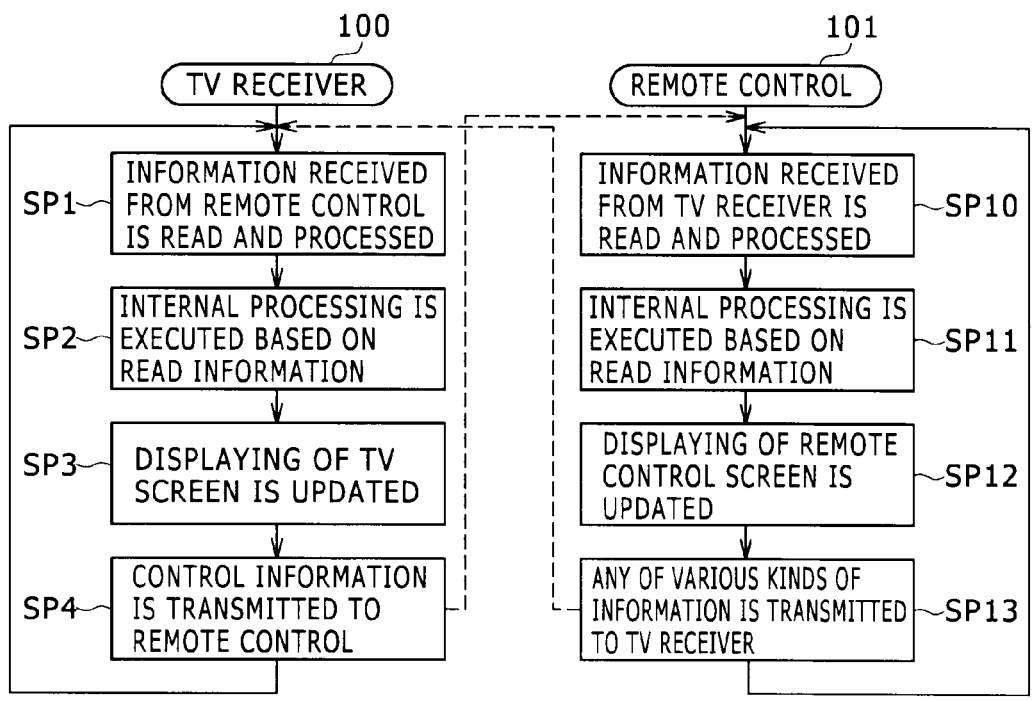
FIG. 9 is a flowchart showing the outline of a two-screen display processing procedure.

First, the outline of the two-screen display processing procedure will be described with use of a sequence chart shown in FIG. 9. This sequence is carried out mainly by the CPU 110 of the TV receiver 100 and the CPU 130 of the remote control 101 in cooperation.

When any of various kinds of information such as operation information is transmitted from the remote control 101 to the TV receiver 100, the TV receiver 100 receives the information via the wireless I/F 113. Thereupon, in a step SP1, the CPU 110 of the TV receiver 100 reads and deciphers this information to move to the next step SP2.

In the step SP2, the CPU 110 executes internal processing such as decision of the information to be displayed on the remote control screen based on the deciphered information and moves to the next step SP3. In the step SP3, the CPU 110 updates the displaying of the TV screen by e.g. displaying an animation and moves to the next step SP4.

In the step SP4, the CPU 110 transmits control information to the remote control 101 via the wireless I/F 113 and returns to the step SP1 again.

When any of various kinds of information such as the control information is transmitted from the TV receiver 100 to the remote control 101, the remote control 101 receives the information via the wireless I/F 135. Thereupon, in a step SP10, the CPU 130 of the remote control 101 reads and deciphers this information to move to the next step SP11.

In the step SP11, the CPU 130 executes internal processing such as preparation of the image data to be displayed on the touch screen 101A based on the deciphered information and moves to the next step SP12.

In the step SP12, the CPU 130 updates the displaying of the remote control screen by e.g. displaying an image based on the prepared image data and moves to the next step SP13.

In the step SP13, the CPU 130 transmits any of various kinds of information such as operation information to the TV receiver 100 via the wireless I/F 135 according to touch operation to the touch screen 101A, and returns to the step SP10 again.

In accordance with such a sequence, communication is performed between the TV receiver 100 and the remote control 101 and the displaying of the respective screens is updated.

Figure 10:
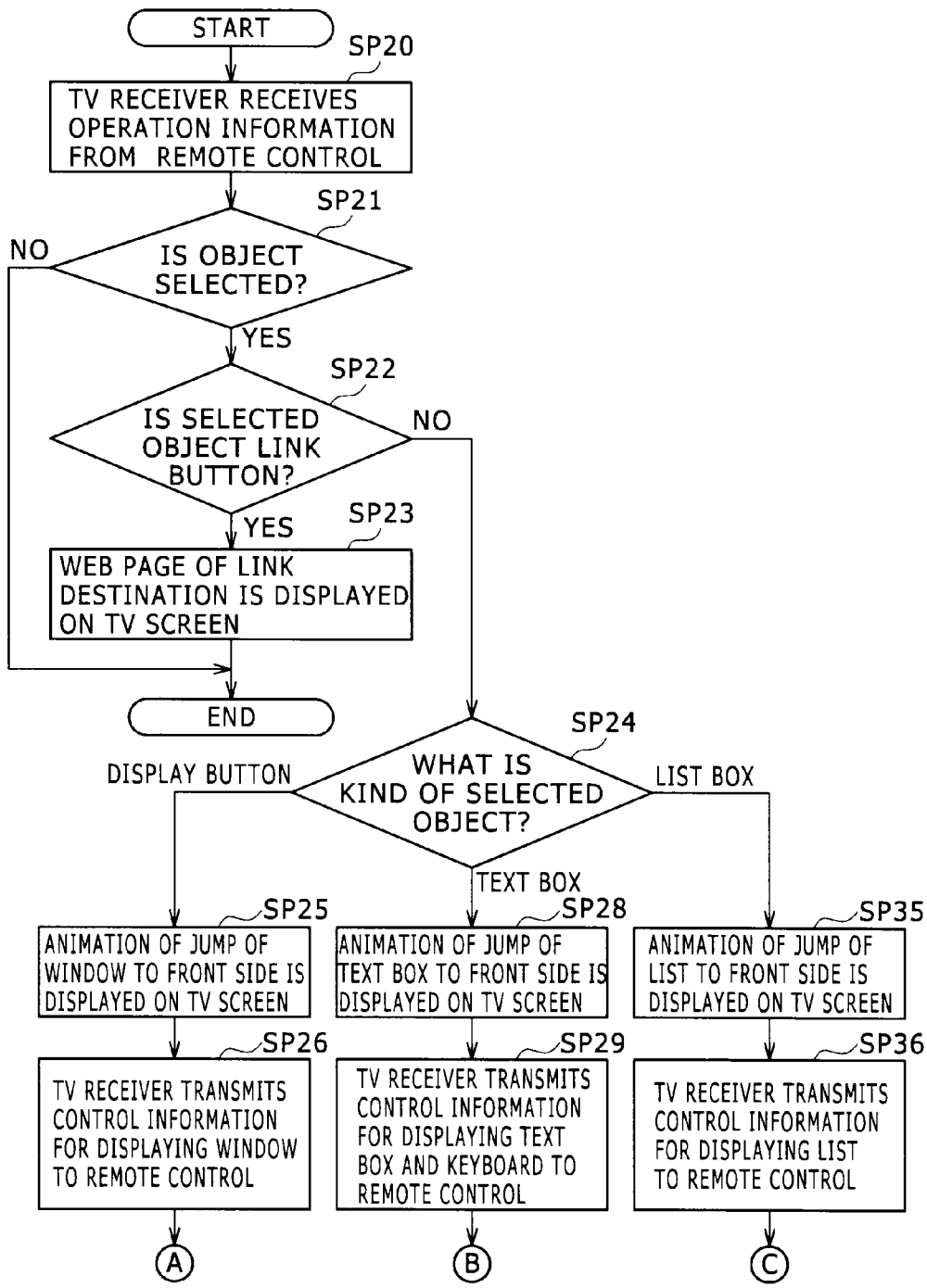
FIG. 10 is a flowchart showing details of the two-screen display processing procedure.
Figure 11:
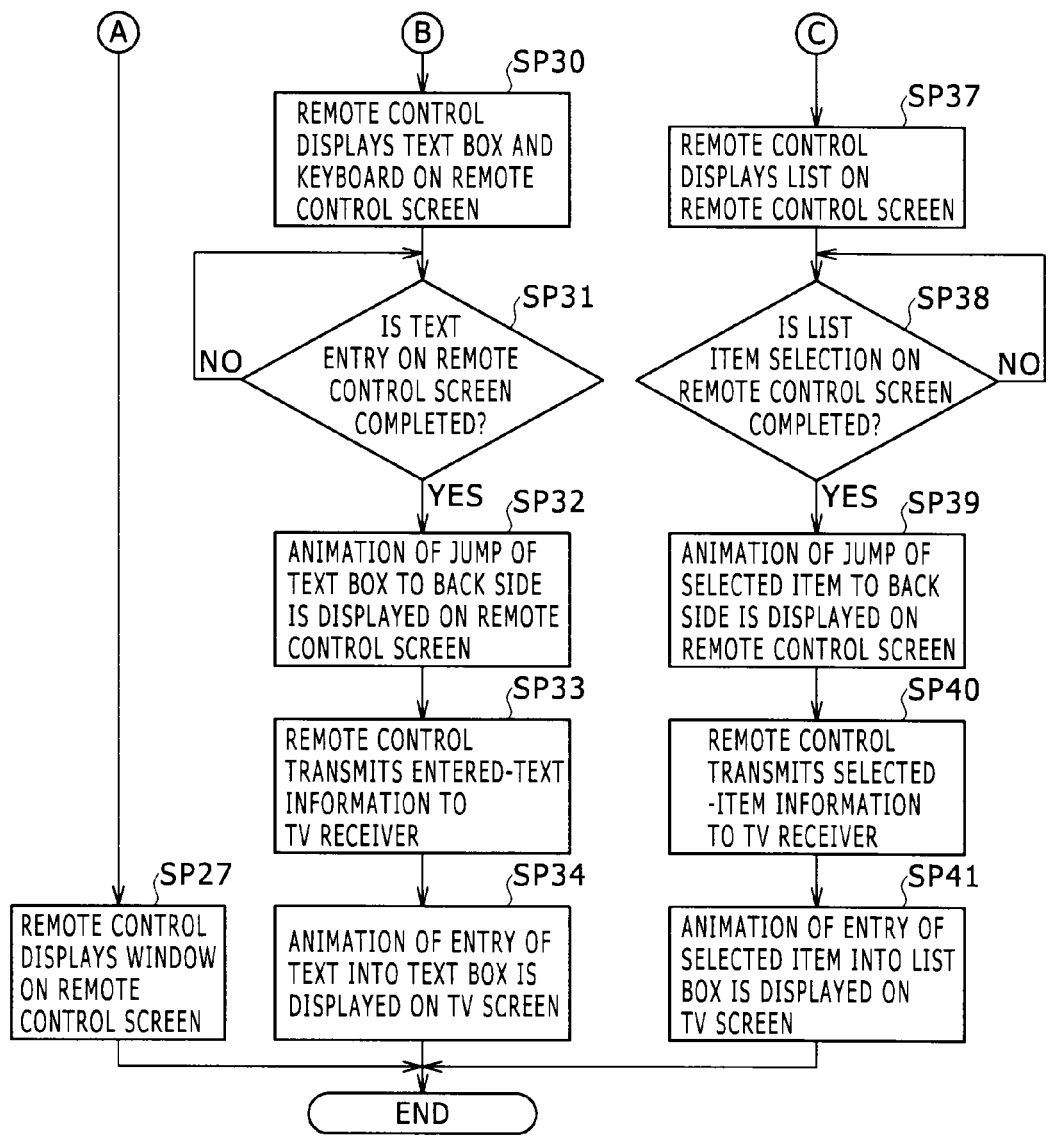
FIG. 11 is a flowchart that follows the flowchart shown in FIG. 10.

With use of flowcharts shown in FIG. 10 and FIG. 11, details of the two-screen display processing procedure will be described below.

First, suppose that the CPU 110 of the TV receiver 100 receives operation information transmitted from the remote control 101 in a step SP20. Thereupon, in the next step SP21, the CPU 110 of the TV receiver 100 determines e.g. whether or not an object on the Web page is selected based on this operation information.

If the negative result is obtained in this step SP21, the two-screen display processing procedure is ended. If the positive result is obtained in this step SP21, in the next step SP22, the CPU 110 of the TV receiver 100 determines whether or not the kind of the selected object is the link button.

If the positive result is obtained in this step SP22, the CPU 110 of the TV receiver 100 decides that the information to be displayed on the remote control screen is absent. In the next step SP23, the CPU 110 displays the Web page of the link destination indicated by the link button Li on the TV screen. Then, this two-screen display processing procedure is ended.

In contrast, if the negative result is obtained in the above-described step SP22, in a step SP24, the CPU 110 of the TV receiver 100 discriminates which one of the following objects the kind of the selected object is: display button, text box, and list box.

If the selected object is discriminated to be the display button, the CPU 110 of the TV receiver 100 employs the window Wd associated with the display button Bt as the information to be displayed on the remote control screen. Then, in the next step SP25, the CPU 110 causes the TV screen to display such an animation that the window Wd associated with the display button Bt jumps out to the front side of the screen.

Thereafter, in the next step SP26, the CPU 110 of the TV receiver 100 transmits control information for displaying the window Wd to the remote control 101.

Upon receiving the control information transmitted from the TV receiver 100, in a step SP27 (FIG. 11), the CPU 130 of the remote control 101 displays the window Wd on the remote control screen based on this control information in such a manner that the window Wd dives from the back side of the screen. Then, this two-screen display processing procedure is ended.

If the kind of the selected object is discriminated to be the text box, the CPU 110 of the TV receiver 100 employs the text box Tbx and the software keyboard Sk as the information to be displayed on the remote control screen. Then, in a step SP28 (FIG. 10), the CPU 110 causes the TV screen to display such an animation that the text box Tbx jumps out to the front side of the screen.

Thereafter, in the next step SP29, the CPU 110 of the TV receiver 100 transmits control information for displaying the text box Tbx and the software keyboard Sk to the remote control 101.

Upon receiving the control information from the TV receiver 100, in a step SP30 (FIG. 11), the CPU 130 of the remote control 101 displays the text box Tbx on the remote control screen based on this control information in such a manner that the text box Tbx dives from the back side of the screen. In addition, the CPU 130 displays the software keyboard Sk on the remote control screen.

Thereafter, in a step SP31, the CPU 130 of the remote control 101 waits for the completion of a text entry into the text box Tbx on the remote control screen.

After recognizing the completion of the text entry, in a step SP32, the CPU 130 of the remote control 101 causes the remote control screen to display such an animation that the text box Tbx jumps out to the back side of the screen.

Thereafter, in a step SP33, the CPU 130 of the remote control 101 transmits entered-text information indicating the entered text to the TV receiver 100.

Upon receiving the entered-text information from the remote control 101, in a step SP34, the CPU 110 of the TV receiver 100 causes the TV screen to display such an animation that the text box Tbx dives from the front side of the screen, and displays the entered text in the text box Tb. Then, this two-screen display processing procedure is ended.

If the kind of the selected object is discriminated to be the list box, the CPU 110 of the TV receiver 100 employs the list Ls associated with the list box Lb as the information to be displayed on the remote control screen. Then, in a step SP35 (FIG. 10), the CPU 110 causes the TV screen to display such an animation that the list Ls associated with the list box Lb jumps out to the front side of the screen.

Thereafter, in the next step SP36, the CPU 110 of the TV receiver 100 transmits control information for displaying the list Ls to the remote control 101.

Upon receiving the control information from the TV receiver 100, in a step SP37 (FIG. 11), the CPU 130 of the remote control 101 displays the list Ls on the remote control screen based on this control information in such a manner that the list Ls dives from the back side of the screen.

Thereafter, in a step SP38, the CPU 130 of the remote control 101 waits for the completion of item selection from the list Ls on the remote control screen.

After recognizing the completion of the item selection, in a step SP39, the CPU 130 of the remote control 101 causes the remote control screen to display such an animation that the box Bx in which only the item Lsi selected from the list Ls is displayed jumps out to the back side of the screen.

Thereafter, in a step SP40, the CPU 130 of the remote control 101 transmits selected-item information indicating the selected item Lsi to the TV receiver 100.

Upon receiving the selected-item information from the remote control 101, in a step SP41, the CPU 110 of the TV receiver 100 causes the TV screen to display such an animation that the box Bx in which only the item Lsi is displayed dives from the front side of the screen, and thereafter displays the selected item Lsi in the list box Lb. Then, this two-screen display processing procedure is ended.

In this manner, in the TV system 102, two screens, the TV screen and the remote control screen, are used in cooperation and information is displayed on the respective screens.

2-5. Operation and Effects

In the above-described configuration, the TV receiver 100 first displays the Web page 200 on the TV screen serving as the main screen.

Thereafter, when an object in this Web page 200 is selected by operation of the remote control 101, the TV receiver 100 decides the information to be displayed on the remote control screen serving as the sub-screen depending on the kind of the selected object.

Specifically, if the selected object is an object for additionally displaying information such as a window or a list like the display button and the list box, the TV receiver 100 decides the information to be additionally displayed (it will be referred to also as the additionally-displayed information) as the information to be displayed on the remote control screen.

Then, the TV receiver 100 controls the remote control 101 to display the additionally-displayed information such as a window or a list on the remote control screen.

If the selected object is an object for a text entry like a text box, the TV receiver 100 employs a text box and a software keyboard as the information to be displayed on the remote control screen.

Then, the TV receiver 100 controls the remote control 101 to display the text box and the software keyboard on the remote control screen.

If the selected object is an object for updating the displayed content of the TV screen like the link button, the TV receiver 100 decides that the information to be displayed on the remote control screen is absent.

In this manner, every time an object displayed on the TV screen is selected, the TV receiver 100 decides the information to be displayed on the remote control screen based on the kind of this object.

Due to this scheme, even information that is not so made as to be displayed by use of plural screens originally like a Web page can be displayed by using two screens, the TV screen and the remote control screen.

According to the above-described configuration, even in the case of displaying information that is not so made as to be displayed by use of plural screens, such as a Web page, this information can be displayed by effectively using two screens, the TV screen and the remote control screen.

3. MODIFICATION EXAMPLES OF EMBODIMENT 3-1. Modification Example 1

In the above-described embodiment, when the text box Tb on the Web page 200 displayed on the TV screen is selected, the text box Tbx and the software keyboard Sb are displayed on the remote control screen so that a text can be entered on the remote control screen.

The following configuration may be employed. Specifically, if the text to be entered into the text box Tb on the Web page 200 is highly confidential information (e.g. password), the text entered on the remote control screen can be checked only on the remote control screen. Here, the information that should be hidden, such as a password, is referred to as the confidential information.

In this case, as shown in FIGS. 12A to 12D, when a text box Tbp for the password entry on the TV screen is selected, the text box Tbx and the software keyboard Sk are displayed on the remote control screen similarly to the case in which the normal text box Tb is selected.

Figures 12A, 12B, 12C, 12D:
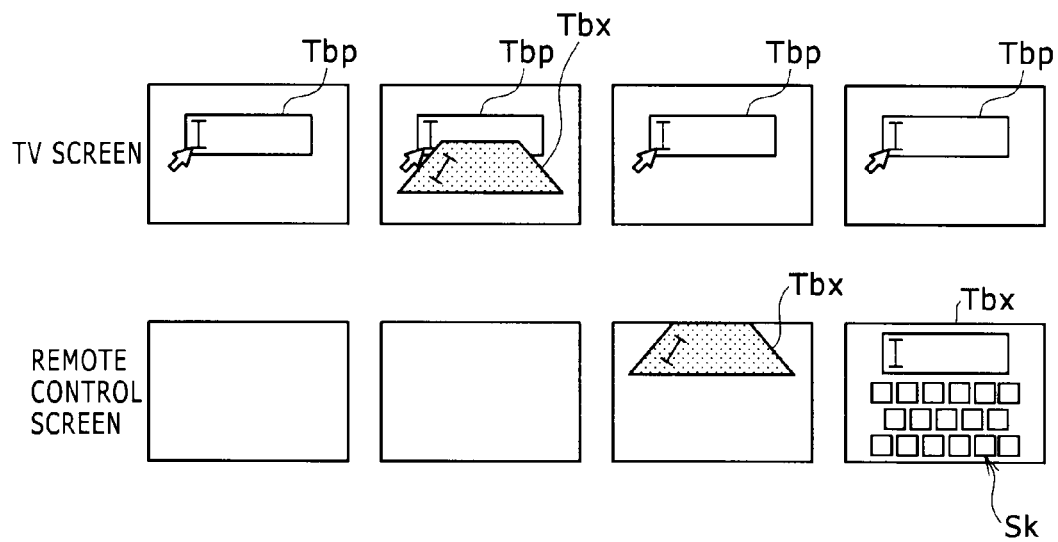
FIGS. 12A to 12H are schematic diagrams for explaining another display example (1) by use of two screens.
Figures 12E, 12F, 12G, 12H:
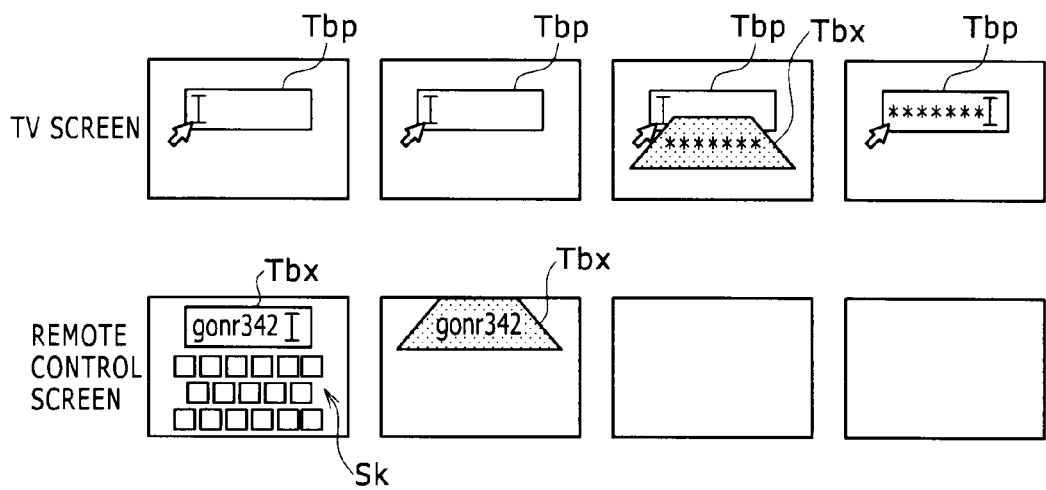

Then, suppose that a text as a password is entered on the remote control screen as shown in FIG. 12E. At this time, the entered password is displayed in the text box Tbx as it is. This allows the user to check the entered password.

After the completion of the entry, as shown in FIG. 12F, the CPU 130 of the remote control 101 displays such an animation that the text box Tbx in which the entered password is displayed jumps out to the back side of the screen.

Furthermore, the CPU 130 transmits entered-text information indicating the entered text (i.e. password) to the TV receiver 100.

Upon receiving this entered-text information, as shown in FIG. 12G, the CPU 110 of the TV receiver 100 causes the TV screen to display such an animation that the text box Tbx in which the password indicated in this entered-text information is displayed in an uncheckable state dives from the front side of the screen.

Then, as shown in FIG. 12H, the CPU 110 displays the password indicated in the entered-text information in an uncheckable state in the text box Tbp for the password entry.

Actually, in FIGS. 12G and 12H, each character of the password indicated in the entered-text information is so displayed as to be replaced by a specific character (in this example, "*"). This precludes the password entered on the remote control screen from being checked on the TV screen.

This allows highly confidential information such as a password to be so entered that the information can be checked only by the user who operates the remote control 101 without being seen by other users viewing the TV screen.

However, the operation way is not limited thereto. On the side of the remote control 101, when such an animation that the text box Tbx jumps out to the back side of the screen is displayed after the completion of a password entry, the password may be displayed in this text box Tbx in an uncheckable state.

In this case, the CPU 110 of the TV receiver 100 transmits, to the remote control 101, control information that orders displaying of a text box and a software keyboard and indicates that the present text entry is a password entry.

Thereby, the CPU 130 of the remote control 101 recognizes that the present text entry is a password entry and displays a password in the text box Tbx in an uncheckable state after the completion of the password entry.

Furthermore, in this password entry, the remote control screen itself may be made difficult to see by people other than the user who operates the remote control 101 by changing the displaying of the remote control screen, such as lowering the luminance of the remote control screen or darkening the color of the whole remote control screen.

Moreover, e.g. the following configuration may also be employed. Specifically, in the password entry, the CPU 130 of the remote control 101 displays a frame on the remote control screen and makes the user touch the area in this frame to thereby acquire the fingerprint of the user. The CPU 130 identifies the user from this fingerprint and automatically enters the password of this user.

3-2. Modification Example 2

In the above-described embodiment, for example when the text box Tb is selected on the TV screen, such an animation that the text box Tbx jumps out from the TV screen to the front side is displayed. Furthermore, such an animation that the text box Tbx dives into the remote control screen from the back side is displayed.

By displaying such an animation, the gaze point of the user is induced from the TV screen to the remote control screen or vice versa in the TV system 102.

However, the configuration is not limited thereto and the gaze point of the user may be induced by other various methods. Another method for inducing the gaze point will be described below with reference to FIGS. 13A to 13I.

First, as shown in FIG. 13A, a horizontally long slit SL is always displayed at an upper end part of the remote control screen.

For example, suppose that the text box Tb is selected on the TV screen. Thereupon, as shown in FIGS. 13B and 13C, the CPU 110 of the TV receiver 100 displays such an animation that the text box Tbx as a copy of the text box Tb downwardly moves and disappears from the lower end of the screen.

Subsequently, the CPU 110 transmits control information for displaying a text box and a software keyboard on the remote control screen to the remote control 101.

Upon receiving this control information, as shown in FIG. 13D, the CPU 130 of the remote control 101 displays such an animation that the text box Tbx is downwardly ejected from the slit SL displayed at the upper end part of the remote control screen.

In this manner, after such an animation that the text box Tbx disappears from the lower end of the screen is displayed on the TV screen, such an animation that the text box Tbx is ejected from the slit SL is displayed on the remote control screen.

This can smoothly induce the gaze point of the user from the TV screen to the remote control screen.

Thereafter, as shown in FIG. 13E, this text box Tbx is displayed at a predetermined position on the remote control screen in a settled manner and the software keyboard Sk is displayed below this text box Tbx.

Then, when a text is entered as shown in FIG. 13F and a predetermined key image of the software keyboard Sk is tapped, the CPU 130 determines that the text entry by the user is completed.

Thereupon, as shown in FIG. 13G, the CPU 130 stops the displaying of the software keyboard Sk and causes the remote control screen to display such an animation that the text box Tbx in which the entered text is displayed is sucked into the slit SL.

Subsequently, the CPU 130 transmits entered-text information indicating the entered text to the TV receiver 100.

Upon receiving this entered-text information, as shown in FIG. 13H, the CPU 110 of the TV receiver 100 displays such an animation that the text box Tbx appears from the lower end of the screen and upwardly moves.

In this manner, after such an animation that the text box Tbx is sucked into the slit SL is displayed on the remote control screen, such an animation that the text box Tbx appears from the lower end of the screen is displayed on the TV screen.

This can smoothly induce the gaze point of the user from the remote control screen to the TV screen.

Thereafter, as shown in FIG. 13I, the CPU 110 displays the text indicated in the entered-text information in the currently-selected text box Tb displayed on the TV screen.

The gaze point of the user may be induced by such a method.

However, the configuration is not limited thereto. A slit may be displayed also at a lower end part of the TV screen and such an animation that an object such as a text box is sucked into and ejected from this slit may be displayed.

Furthermore, without displaying the slit SL on the remote control screen, such an animation that an object appears from the upper end of the screen may be displayed on the remote control screen.

In addition, a sentence that prompts the shift of the gaze point to the remote control screen may be displayed on the TV screen, and sound that prompts the shift of the gaze point may be output from the speaker 100B of the TV receiver 100.

Moreover, the chassis of the remote control 101 may include a built-in motor for vibrating the chassis and this motor may be driven to vibrate the chassis to thereby induce the gaze point to the remote control screen.

The gaze point of the user may be induced by combining various methods like these methods.

3-3. Modification Example 3

In the above-described embodiment, in a text entry, the text box Tbx and the software keyboard Sk are displayed on the remote control screen.

At this time, not only the animation of the text box Tbx but also an animation of the software keyboard Sk (e.g. such an animation that the software keyboard Sk appears from the lower end of the screen) may be displayed.

3-4. Modification Example 4

In the above-described embodiment, for example, when the display button Bt is selected on the TV screen, the image data of the corresponding window Wd and control information including a command to order displaying of the window Wd are transmitted from the TV receiver 100 to the remote control 101.

However, the configuration is not limited thereto. For example, instead of the image data of the window Wd, the source for generating the image data of the window Wd and the command may be transmitted to the remote control 101.

In this case, the CPU 130 of the remote control 101 generates the image data of the window Wd based on this source and displays the window Wd on the remote control screen.

If this source includes the address of content that exists on the Internet, the TV receiver 100 transmits also the data of the content acquired from the Internet together with the source to the remote control 101.

This allows the remote control 101 to display the window Wd to reproduce the content on the remote control screen.

By giving an Internet connection function to the remote control 101, the remote control 101 itself may be allowed to access the Internet and acquire the data of content based on the address included in the source.

3-5. Modification Example 5

In the above-described embodiment, the information to be displayed on the remote control screen is decided depending on the kind of object as the operation subject selected on the TV screen.

However, the configuration is not limited thereto. The information to be displayed on the remote control screen may be decided depending on various attributes of the object.

For example, when a text box is selected, the information to be displayed on the remote control screen may be decided depending on the information that should be entered into this text box.

Specifically, if the information that should be entered is highly confidential information (password, credit card number, etc.), a text box and a software keyboard are displayed on the remote control screen to permit a text entry on the remote control screen.

If the entry subject is not highly confidential information, no object is displayed on the remote control screen and a direct text entry into a text box on the TV screen is permitted.

Furthermore, for example, when a list box is selected, the information to be displayed on the remote control screen may be decided depending on the number of items of the list associated with this list box.

Specifically, for example, if the number of items of the list is equal to or larger than a predetermined number, this list is employed as the information to be displayed on the remote control screen. If the number of items is smaller than the predetermined number, it is decided that the information to be displayed on the remote control screen is absent. In this case, the list is displayed on the TV screen.

Moreover, for example, when a display button is selected, the information to be displayed on the remote control screen may be decided depending on the display size of the window associated with the display button.

Specifically, for example, if the display size of the window is equal to or smaller than a predetermined size (e.g. display size of the remote control screen), this window is employed as the information to be displayed on the remote control screen. If the display size surpasses the predetermined size, it is decided that the information to be displayed on the remote control screen is absent. In this case, the window is displayed on the TV screen.

3-6. Modification Example 6

In the above-described embodiment, when an object on a Web page displayed on the TV screen is selected, the information to be displayed on the remote control screen is decided depending on the kind of the object. However, the configuration is not limited thereto. When any of various operation subjects on any of other various application screens displayed on the TV screen is operated, the information to be displayed on the remote control screen may be decided depending on the attributes of the operation subject.

3-7. Modification Example 7

The above-described embodiment relates to application to the TV system 102 having two display sections, i.e. the display 100A of the TV receiver 100 and the touch screen 101A of the remote control 101.

However, the application is not limited thereto. An embodiment of the present disclosure may be and can be applied to other systems and devices having two display sections.

For example, an embodiment of the present disclosure may be applied to e.g. a system composed of a notebook personal computer and a cellular phone, a system composed of a stationary game machine connected to a monitor and a portable game machine, and one piece of apparatus having two display sections.

3-8. Modification Example 8

In the above-described embodiment, the remote control 101 is provided with the touch screen 101A composed of the display panel 133 and the touch panel 134.

However, the configuration is not limited thereto. Instead of the touch screen 101A, a display having a touch panel function may be provided in the remote control 101.

As the display panel 133, various displays such as a liquid crystal display and an electroluminescence (EL) display may be used.

Furthermore, the remote control 101 is not limited to a device serving as both an operation section and a display section. For example, a display panel and an operation button may be individually provided in the remote control 101.

3-9. Modification Example 9

In the above-described embodiment, in the TV receiver 100 as the information processing device and the first device, the display 100A as the first display section, the CPU 110 as the controller and the first controller, and the wireless I/F 113 as the communication section and the first communication section are provided.

However, an embodiment of the present disclosure is not limited thereto. The above-described respective functional sections of the TV receiver 100 (first display section, controller, first controller, communication section, and first communication section) may be configured by other various pieces of hardware as long as they have similar functions.

Furthermore, an embodiment of the present disclosure is not limited to the TV receiver 100 and may be applied to a personal computer, video recorder, game machine, etc. connected to a monitor as long as it has similar functions.

On the other hand, in the remote control 101 as the information processing device and the second device, the touch screen 101A as the second display section, the CPU 130 as the controller and the second controller, and the wireless I/F 135 as the communication section and the second communication section are provided.

However, an embodiment of the present disclosure is not limited thereto. The above-described respective functional sections of the remote control 101 (second display section, controller, second controller, communication section, and second communication section) may be configured by other various pieces of hardware as long as they have similar functions.

Furthermore, an embodiment of the present disclosure is not limited to the remote control 101 and may be applied to a smartphone, portable game machine, tablet computer, etc. as long as it has similar functions.

3-10. Modification Example 10

In the above-described embodiment, a program for executing the respective kinds of processing is written in the non-volatile memory 111 of the TV receiver 100.

However, the configuration is not limited thereto. For example, a slot for a storage medium such as a memory card may be provided in the TV receiver 100, and the CPU 110 may read out the program from the storage medium inserted into this slot and run the program. Furthermore, the CPU 110 may install the program read out from this storage medium into the non-volatile memory 111. Moreover, the CPU 110 may download this program from apparatus on the Internet via the network interface 121 and install the program into the non-volatile memory 111.

This applies also to the remote control 101. For example, a program may be downloaded from external apparatus via the wireless I/F 135 and installed into the non-volatile memory 131.

3-11. Modification Example 11

An embodiment of the present disclosure is not limited to the above-described embodiment and modification examples. Specifically, the application range of an embodiment of the present disclosure covers also modes obtained by arbitrarily combining part or all of the above-described embodiment and modification examples and modes obtained by extracting part of them.

An embodiment of the present disclosure can be widely utilized in systems and devices having plural display sections.

The present disclosure contains subject matter related to that disclosed in Japanese Priority Patent Application JP 2011-022983 filed in the Japan Patent Office on Feb. 4, 2011, the entire content of which is hereby incorporated by reference.

What is claimed is:

1. An information processing device comprising:
a controller circuit configured to decide information to be displayed on a second display section based on an attribute of an operation subject displayed on a first display section when the operation subject is operated; and
a communication circuit configured to transmit control information for causing the second display section to display the information decided by the controller circuit to a device having the second display section,
wherein when operation of selecting a text entry field displayed on the first display section is carried out, the controller circuit employs the text entry field as the information to be displayed on the second display section, and the communication circuit transmits control information for causing the second display section to display the text entry field to the device having the second display section, after transmitting the control information, the communication circuit receives entered-text information that is transmitted from the device having the second display section and indicates an entered text, and the controller circuit displays the text indicated in the entered-text information received by the communication circuit in the text entry field displayed on the first display section, and the controller circuit displays the text indicated in the entered-text information received by the communication circuit in an uncheckable state in the text entry field displayed on the first display section if a text to be entered into the text entry field displayed on the first display section is confidential information.

2. The information processing device according to claim 1, wherein when operation of pressing down an additional information display button displayed on the first display section is carried out, the controller circuit employs additionally-displayed information to be additionally displayed in response to the operation as the information to be displayed on the second display section, and the communication circuit transmits control information for causing the second display section to display the additionally-displayed information to the device having the second display section.

3. The information processing device according to claim 1, wherein the controller circuit decides that the information to be displayed on the second display section is absent and updates displayed content of the first display section when operation of pressing down a displayed-content update button displayed on the first display section is carried out.

4. The information processing device according to claim 1, wherein after deciding the information to be displayed on the second display section, the controller circuit causes the first display section to display such an animation that the information decided to be displayed on the second display section jumps out from a screen.

5. An information processing method comprising:
deciding, by a controller circuit, information to be displayed on a second display section based on an attribute of an operation subject displayed on a first display section when the operation subject is operated; and
transmitting, by a communication circuit, control information for causing the second display section to display the information decided by the controller circuit to a device having the second display section,
wherein when operation of selecting a text entry field displayed on the first display section is carried out, the controller circuit employs the text entry field as the information to be displayed on the second display section, and the communication circuit transmits control information for causing the second display section to display the text entry field to the device having the second display section, after transmitting the control information, the communication circuit receives entered-text information that is transmitted from the device having the second display section and indicates an entered text, and the controller circuit displays the text indicated in the entered-text information received by the communication circuit in the text entry field displayed on the first display section, and the controller circuit displays the text indicated in the entered-text information received by the communication circuit in an uncheckable state in the text entry field displayed on the first display section if a text to be entered into the text entry field displayed on the first display section is confidential information.

6. A non-transitory computer readable medium encoded with an information processing program for causing an information processing device to carry out a method comprising:
  deciding, by a controller circuit, information to be displayed on a second display section based on an attribute of an operation subject displayed on a first display section when the operation subject is operated; and
  transmitting, by a communication circuit, control information for causing the second display section to display the information decided by the controller to a device having the second display section,
  wherein when operation of selecting a text entry field displayed on the first display section is carried out, the controller circuit employs the text entry field as the information to be displayed on the second display section, and the communication circuit transmits control information for causing the second display section to display the text entry field to the device having the second display section, after transmitting the control information, the communication circuit receives entered-text information that is transmitted from the device having the second display section and indicates an entered text, and the controller circuit displays the text indicated in the entered-text information received by the communication circuit in the text entry field displayed on the first display section, and the controller circuit displays the text indicated in the entered-text information received by the communication circuit in an uncheckable state in the text entry field displayed on the first display section if a text to be entered into the text entry field displayed on the first display section is confidential information.

7. An information processing system comprising:
  a first device; and
  a second device,
  wherein the first device includes
    a first controller circuit configured to decide information to be displayed on a second display section based on an attribute of an operation subject displayed on a first display section when the operation subject is operated, and
    a first communication circuit configured to transmit control information for causing the second display section to display the information decided by the first controller circuit to the second device having the second display section,
  wherein when operation of selecting a text entry field displayed on the first display section is carried out, the first controller circuit employs the text entry field as the information to be displayed on the second display section, and the first communication circuit transmits control information for causing the second display section to display the text entry field to the second device, after transmitting the control information, the first communication circuit receives entered-text information that is transmitted from the second device and indicates an entered text, and the first controller circuit displays the text indicated in the entered-text information received by the first communication circuit in the text entry field displayed on the first display section, and the first controller circuit displays the text indicated in the entered-text information received by the first communication circuit in an uncheckable state in the text entry field displayed on the first display section if a text to be entered into the text entry field displayed on the first display section is confidential information, and
  the second device includes
    a second communication circuit configured to receive the control information transmitted from the first device, and
    a second controller circuit configured to cause the second display section to display the information decided to be displayed on the second display section based on the control information received by the second communication circuit.

* * * * *